US010650239B2

(12) United States Patent
Gibbon et al.

(10) Patent No.: US 10,650,239 B2
(45) Date of Patent: May 12, 2020

(54) CONTEXT-BASED OBJECT LOCATION VIA AUGMENTED REALITY DEVICE

(71) Applicant: AT&T Intellectual Property I, L.P., Atlanta, GA (US)

(72) Inventors: David Crawford Gibbon, Lincroft, NJ (US); Eric Zavesky, Austin, TX (US); Bernard S. Renger, New Providence, RI (US); Behzad Shahraray, Holmdel, NJ (US); Lee Begeja, Gillette, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/044,685

(22) Filed: Jul. 25, 2018

(65) Prior Publication Data
US 2020/0034619 A1    Jan. 30, 2020

(51) Int. Cl.
| G06K 9/00 | (2006.01) |
| G06K 9/72 | (2006.01) |
| G01C 21/20 | (2006.01) |
| G06T 7/70 | (2017.01) |

(52) U.S. Cl.
CPC ......... *G06K 9/00671* (2013.01); *G01C 21/20* (2013.01); *G06K 9/726* (2013.01); *G06T 7/70* (2017.01); *G06T 2207/30252* (2013.01)

(58) Field of Classification Search
CPC .......................... G06K 9/00671; G06K 11/00
See application file for complete search history.

(56) References Cited

U.S. PATENT DOCUMENTS

| 9,269,011 | B1* | 2/2016 | Sikka .................... G06K 9/3233 |
| 9,619,944 | B2 | 4/2017 | Finn et al. |
| 9,817,848 | B2 | 11/2017 | McKinnon et al. |
| 2011/0313649 | A1* | 12/2011 | Bales ..................... G01C 21/20 701/455 |
| 2014/0297624 | A1* | 10/2014 | Jarvis ..................... G06F 17/50 707/722 |
| 2017/0061200 | A1* | 3/2017 | Wexler .............. G06K 9/00255 |
| 2017/0090589 | A1 | 3/2017 | Sharma et al. |
| 2017/0115742 | A1 | 4/2017 | Xing et al. |
| 2017/0161958 | A1 | 6/2017 | Eilat |
| 2017/0193302 | A1 | 7/2017 | Mullins |
| 2017/0352186 | A1 | 12/2017 | Dauphiny et al. |
| 2018/0036175 | A1* | 2/2018 | Rollend ................... A61F 9/08 |
| 2018/0061132 | A1 | 3/2018 | Lanier et al. |
| 2018/0143431 | A1* | 5/2018 | Matsuura .............. B60K 35/00 |
| 2018/0181810 | A1* | 6/2018 | Jhawar ................... G06F 3/012 |
| 2018/0276241 | A1* | 9/2018 | Hebbalaguppe .......... G01S 5/00 |

FOREIGN PATENT DOCUMENTS

| WO | 2016191051 A1 | 12/2016 |
| WO | 2017173457 A1 | 10/2017 |
| WO | 2017180206 A1 | 10/2017 |
| WO | 2017217675 A1 | 12/2017 |
| WO | 2018029426 A1 | 2/2018 |
| WO | 2018032083 A1 | 2/2018 |

* cited by examiner

*Primary Examiner* — Ryan R Yang

(57) ABSTRACT

Devices, computer-readable media, and methods for providing an enhanced indication of an object that is located via a visual feed in accordance with a user context are disclosed. For instance, in one example, a processing system including at least one processor may detect a user context from a visual feed, locate an object via the visual feed in accordance with the user context, and provide an enhanced indication of the object via an augmented reality display.

20 Claims, 4 Drawing Sheets

CONTEXT-BASED OBJECT LOCATION VIA AUGMENTED REALITY DEVICE

The present disclosure relates generally to visual enhancement devices, and more particularly to devices, computer-readable media, and methods for providing an enhanced indication of an object that is located via a visual feed in accordance with a user context.

BACKGROUND

Various devices are available to assist users in finding objects in an environment, such as binoculars, telescopes, and the like.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, non-transitory (i.e., tangible or physical) computer-readable storage media, and methods for providing an enhanced indication of an object that is located via a visual feed in accordance with a user context. For instance, in one example, a processing system including at least one processor may detect a user context from a visual feed, locate an object via the visual feed in accordance with the user context, and provide an enhanced indication of the object via an augmented reality display.

Examples of the present disclosure relate to visual enhancement devices, e.g., augmented reality devices, such as smart glasses, immersive goggles, or other types of wearable computing devices, smartphones, and so forth, equipped with computer vision and wireless networking components that augment a user's view to navigate the user towards a particular object. In particular, examples of the present disclosure recognize a user context based upon a current set of inputs such as visual and/or audio information from an environment, location information, biometric information, time information, and so forth. Examples of the present disclosure may then identify localized object(s) in focus based on the user context. For instance, a specific object detection framework may be activated based upon the user context. An object, a type of object, and/or a group of objects may be searched for in a visual feed in accordance with the detection framework. The object may comprise a vehicle, a landmark, a person, and so forth. When the object is detected, an enhanced indication of the object may then be provided via the visual enhancement device. The enhanced indication may comprise, for example, a highlighting of the object (e.g., a halo, a brightening, a color change, a circle or box around the object, a blinking of the object or a lighting around the object, etc.), a visual enlargement of the device, a visual navigation indicator, such as an arrow pointing in the direction of the object, and so on. In addition, in one example, the present disclosure may provide a combination of experiences for multiple users for a single task. For instance, the system may automatically coordinate between users as to which object to emphasize and/or to provide navigational assistance for all users to reach the object or to otherwise meet up with each other. These and other aspects of the present disclosure are discussed in greater detail below in connection with the examples of FIGS. 1-4.

Figure 1:
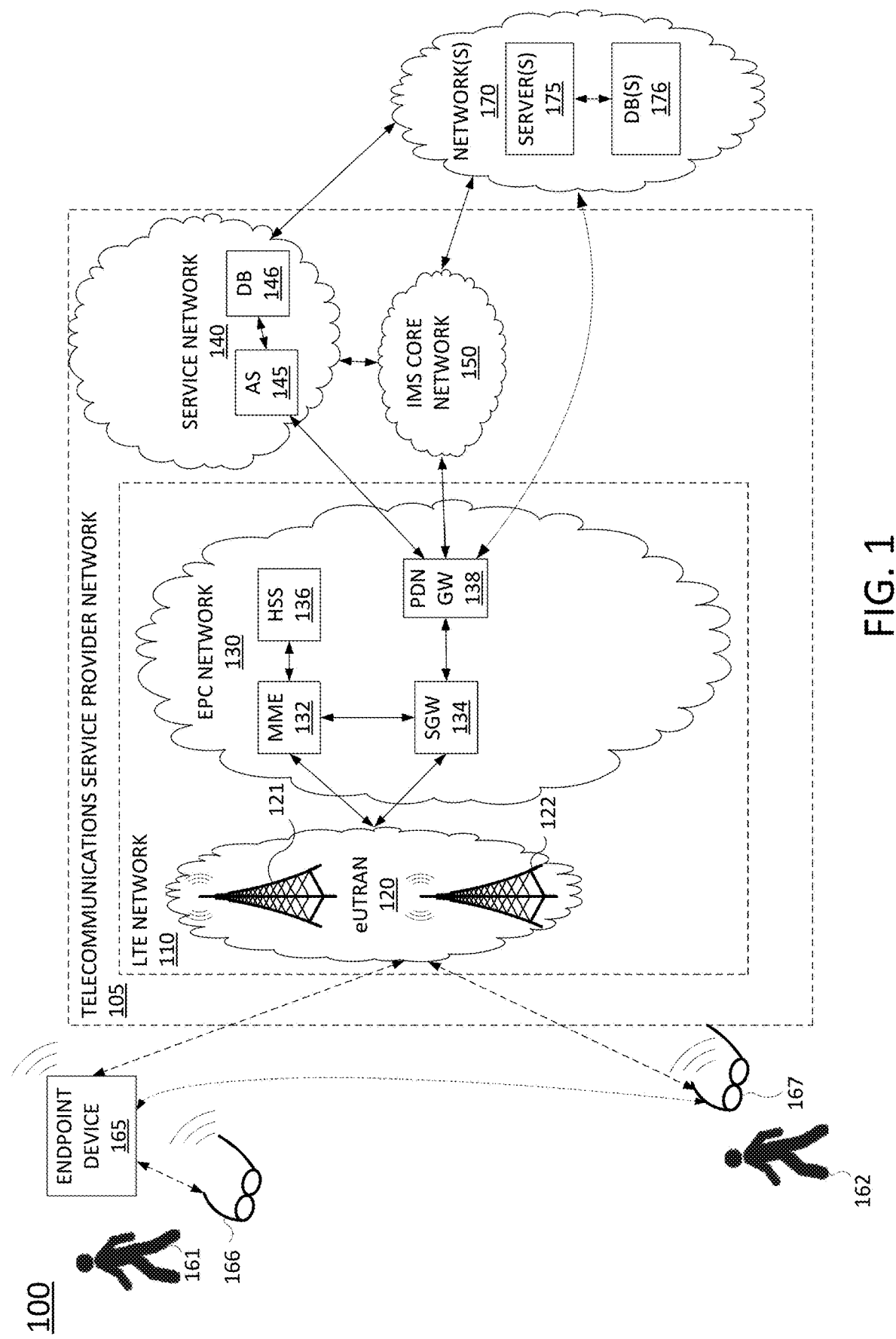
FIG. 1 illustrates an example of a system including a telecommunication service provider network, according to the present disclosure.

FIG. 1 illustrates an example network, or system 100 that may implement or support examples of the present disclosure for providing an enhanced indication of an object that is located via a visual feed in accordance with a user context. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint device 165, and endpoint devices 166 and 167 (broadly "visual enhancement devices") with devices, e.g., servers 175 in networks 170, with other endpoint devices (not shown) and/or with other components of telecommunication service provider network 105.

As illustrated in FIG. 1, endpoint device 165 and endpoint device 166 may be associated with user 161. Endpoint device 165 may comprise, for example, a cellular telephone, a smartphone, a tablet computing device, a laptop computer, a wireless enabled wristwatch, or any other wireless and/or cellular-capable mobile telephony and computing devices (broadly, a "mobile endpoint device"). Endpoint device 166 may comprise, for example, a wearable computing device, such as a head-mounted smart camera, a pair of smart glasses, and so forth. As further illustrated in FIG. 1, endpoint device 167 may be associated with user 162 and may comprise a wearable computing device, such as a head-mounted smart camera, a pair of smart glasses, and so forth. In one example, endpoint devices 165-167 may be equipped for non-cellular wireless communication. In another example, endpoint devices 165-167 may be equipped for cellular and non-cellular wireless communication. For instance, endpoint device 105-167 may include components which support peer-to-peer and/or short range wireless communications. Thus, each of the endpoint devices 165-167 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth. In the example of FIG. 1, endpoint devices 165 and 167 may be equipped for cellular communication, and thus are illustrated as having connections to LTE network 110. In contrast, endpoint device 166 may not have cellular communication capabilities, or may have such features disabled, and therefore is illustrated as having a local connection to endpoint device 165. In one example, remote communications may still be sent to and received from endpoint device 166 via the remote communication capability of endpoint device 165.

Endpoint devices 165-167 may be equipped with display screens, speakers, headsets, and the like for displaying and/or presenting communications, and for receiving inputs relating to such communications. In addition, endpoint devices 165-167 may be equipped with one or more cameras for capturing images (including still images and/or video) from an environment. For instance, endpoint device 166 may comprise smart glasses with an outward facing camera to capture images from a field of view in a direction that user 161 is looking. In one example, endpoint devices 165-167 may have augmented reality (AR) enhancement capabilities. For instance, endpoint device 166 may have a screen and a reflector to project outlining, highlighting, or other visual markers to the eye(s) of user 161 to be perceived in conjunction with the surroundings. In one example, endpoint device 167 may include the same or similar components and provide the same or similar functionality. In one example, device 165 (e.g., a smartphone) may also project outlining, highlighting, or other visual markers, or may overlay such visual markers via a screen which may represent the imagery of a scene captured via a camera of the device 165.

In one example, any one or more of endpoint devices 165-167 may include additional components, such as a Global Positioning System (GPS) unit, a gyroscope, and a compass. In addition, in one example, endpoint devices 165-167 may comprise all or a portion of a computing device or system, such as computing system 400, and/or processing system 402 as described in connection with FIG. 4 below, specifically configured to perform various steps, functions, and/or operations for providing an enhanced indication of an object that is located via a visual feed in accordance with a user context, as described herein. An example method 300 for providing an enhanced indication of an object that is located via a visual feed in accordance with a user context is described in greater detail below in connection with FIG. 3.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3$^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint device 165 and/or endpoint device 167, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and or users. For example, telecommunications service provider network 105 may provide a cloud storage service, a web server hosting service, and other services. As such, service network 140 may represent aspects of telecommunications service provider network 105 where infrastructure for supporting such services may be deployed. In the example of FIG. 1, service network 140 may include an application server (AS) 145. In one example, AS 145 may comprise all or a portion of a computing device or system, such as computing system 400, and/or processing system 402 as described in connection with FIG. 4 below, specifically configured to perform various steps, functions, and/or operations for providing an enhanced indication of an object that is located via a visual feed in accordance with a user context, in accordance with the present disclosure. In one example, service network 140 may also include a database (DB) 146, e.g., a physical storage device integrated with AS 145 (e.g., a database server), or attached or coupled to the AS 145, to store various types of information in support of systems for providing an enhanced indication of an object that is located via a visual feed in accordance with a user context, in accordance with the present disclosure. For example, DB 146 may store user context filters for a variety of user contexts and for a plurality of users. In accordance with the present disclosure, a user context may comprise a semantic content, and the user context filter may comprise a machine learning model for detecting the semantic content from a plurality of inputs. The inputs may include information from a visual feed and may further include location information, time information, biometric information, and so forth. The user context may comprise, for example, a semantic content of "shopping," "parking lot," "running," birdwatching," "meetup," and so forth.

DB 146 may further store, for each user context filter, at least one object model for detecting/locating an object or objects in a visual feed. In one example, DB 146 may store the user context filters and/or object models on behalf of users associated with endpoint devices 165-167. AS 145 may provide the user context filters and/or object models from DB 146 to endpoint devices 165-167 when requested. Endpoint devices 165-167 may then detect user contexts from visual feeds in accordance with the respective user context filters, may locate objects in the visual feeds in accordance with the associated object models, and may provide enhanced indications of the object(s) via augmented reality displays of the respective endpoint devices 165-167.

Alternatively, or in addition, AS 145 may receive inputs from a visual feed, such as visual and/or audio information from an environment, location information, biometric information, and so forth from endpoint devices 165-167, and may detect user contexts from the video feeds in accordance with the respective user context filters, may locate objects in the visual feeds in accordance with the associated object models, and may provide enhanced indications of the object (s) via augmented reality displays of the respective endpoint devices 165-167.

Figure 4:
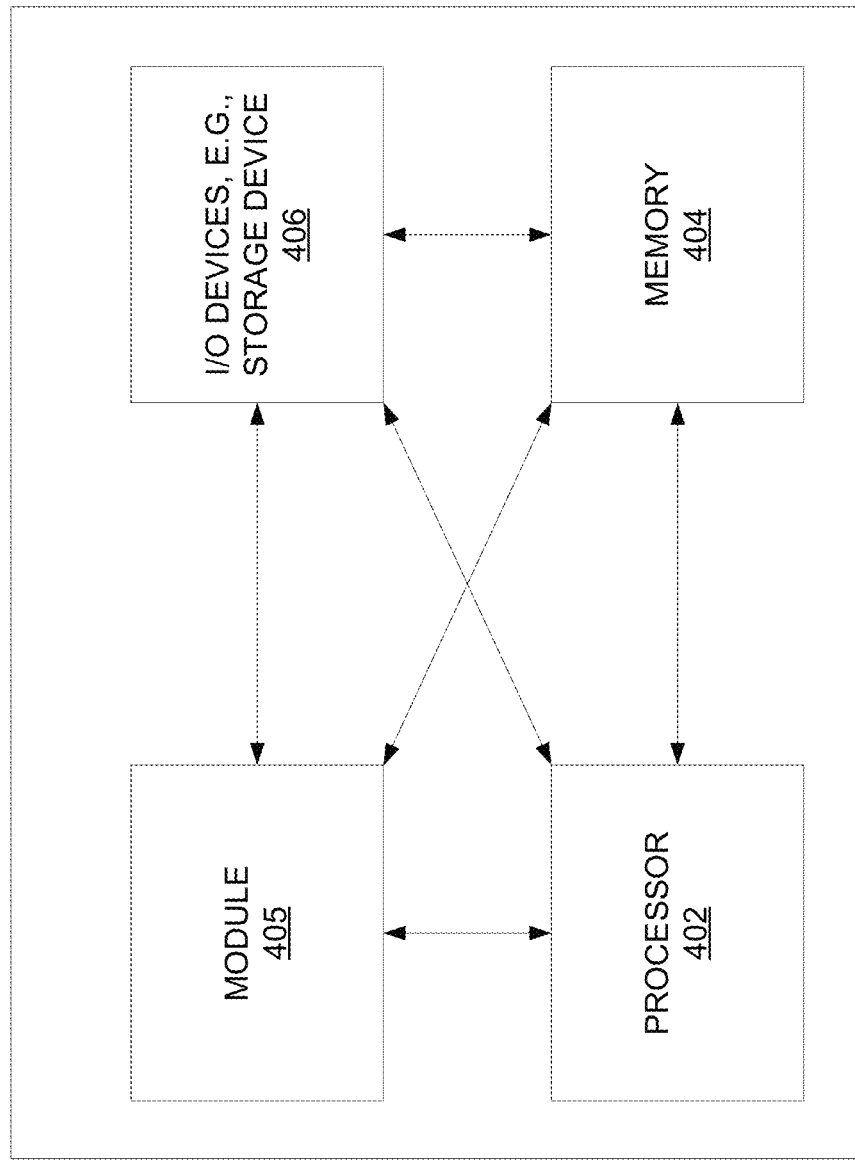
FIG. 4 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. As illustrated in FIG. 1, networks 170 include one or more servers 175 which may each comprise all or a portion of a computing device or system, such as computing system 400, and/or processing system 402 as described in connection with FIG. 4 below, specifically configured to perform various steps, functions, and/or operations for providing an enhanced indication of an object that is located via a visual feed in accordance with a user context, as described herein. In one example, networks 170 may also include one or more databases (DBs) 176, e.g., physical storage devices integrated with server(s) 175 (e.g., a database server), or attached or coupled to the server(s) 175, to store various types of information in support of systems for providing an enhanced indication of an object that is located via a visual feed in accordance with a user context, as described herein. As just one example, DB(s) 176 may store user context filters for a variety of user contexts and for a plurality of users. DB(s) 176 may also store, for each user context filter, at least one object model for detecting/locating an object or objects in a visual feed. In one example, endpoint devices 165 and 167 may be connected to the one or more servers 175 via PDN GW 138, and/or via PDN GW 138 and IMS core network 150. In this regard, it should be noted that various functions that may be performed by AS 145 may alternatively or additionally be performed by the one or more of servers 175, and vice versa. In addition, in one example, AS 145 may retrieve user context filters and object models from DB(s) 176 via network(s) 170 (e.g., via the Internet in general). Similarly, in one example, one or more of servers 175 may retrieve user context filters and object models from DB 146.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, PDN GW 138, AS 145, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, AS 145, DB 146, servers 175 and/or DBs 176 may comprise cloud-based and/or distributed data storage and/or processing systems comprising one or more servers at a same location or at different locations. However, for ease of illustration, these components are depicted as standalone devices in FIG. 1. In addition, although the AS 145 and DB 146 are illustrated as components of service network 140, in other examples, any one or more of these components may be deployed in a different configuration, such as in LTE network 110, IMS network 150, and so forth. Thus, these and other modifications are all contemplated within the scope of the present disclosure.

Figure 2:
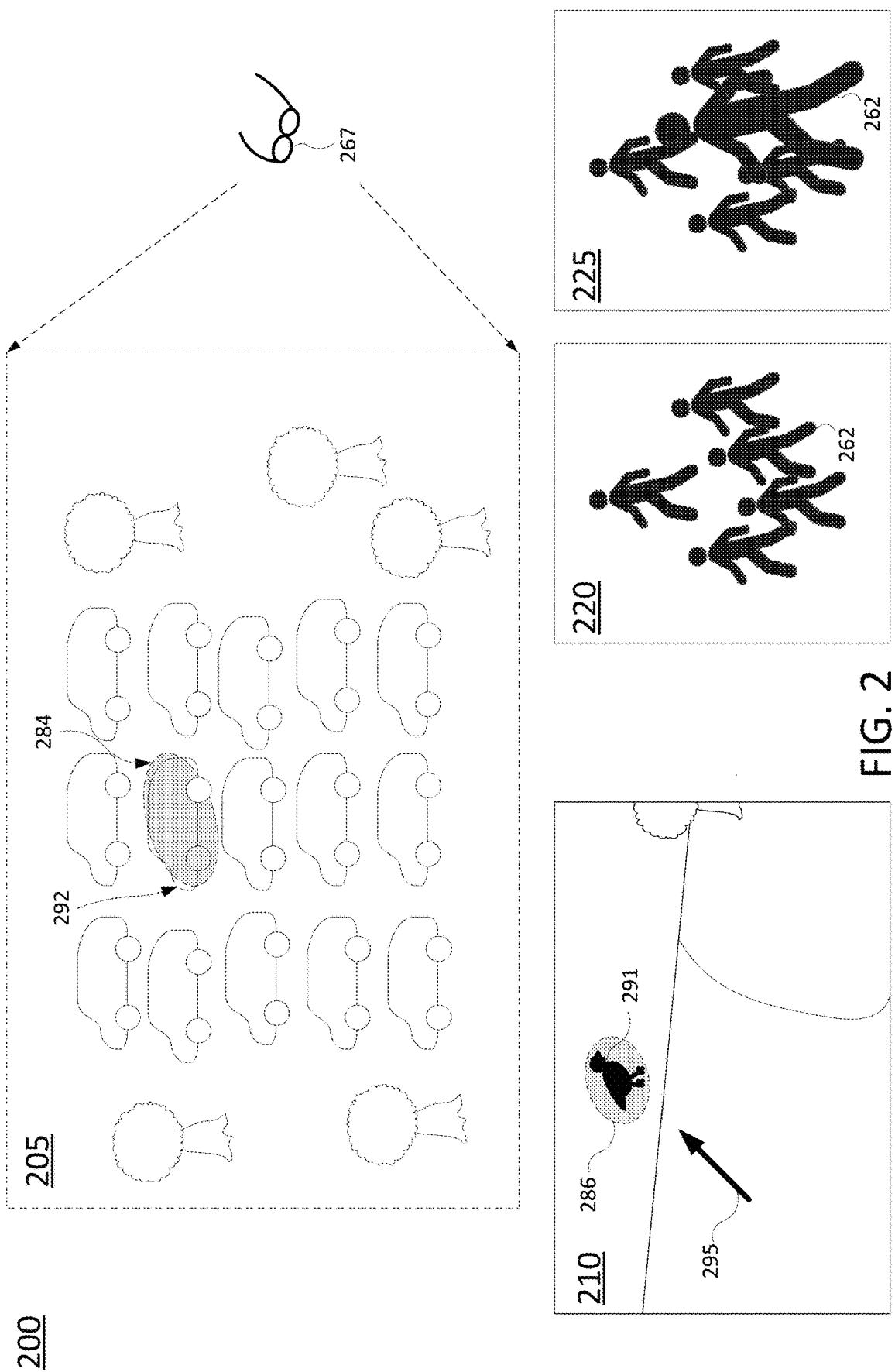
FIG. 2 illustrates a pictorial representation of providing an enhanced indication of an object that is located via a visual feed in accordance with a user context.

To aid in understanding the present disclosure, FIG. 2 illustrates a pictorial representation of an example 200 for providing an enhanced indication of an object that is located via a visual feed in accordance with a user context. As shown in FIG. 2, a user may be viewing an environment via an endpoint device 267 with a view 205 being presented to the user (e.g., via an augmented reality display). The endpoint device 267 may be running one or more user context filters for detecting a user context. In the present example, a user context filter for the user context of "parking lot" may be active. The user context filter may be activated in connection with a number of factors. For instance, in one example, a user context filter for "parking lot" may be activated when it is detected that the user is within a certain range of his or her vehicle. For instance, the car 292 may be equipped for cellular and/or non-cellular wireless communications, such as Bluetooth, Wi-Fi Direct, or other network-based or peer-to-peer type communications. Thus, endpoint device 267 may determine that the user's car 292 is within a threshold distance (e.g., 100 meters, 250 meters, etc.) to activate the user context filter for "parking lot." The vehicle 292 may be equipped with GPS and may provide its location in latitude and longitude coordinates. In another example, the threshold distance may be determined when the devices are within a peer-to-peer communication range or a threshold signal strength of a wireless beacon signal is detected (e.g., a Bluetooth discovery mode signal), when the devices are within communication range of a same cell tower, and so on. In various examples, user context filters may be activated and deactivated manually by a user, according to a schedule, based upon learned user behaviors, based upon location (e.g., certain user context filters may be active when the user is detected to be at or near the user's home versus the user's place of work or elsewhere), and so forth.

The user context filter may comprise a machine learning model (MLM) for detecting a semantic content (e.g., the user context of "parking lot") from a plurality of inputs. To illustrate, the endpoint device 267 may have a visual feed captured via a camera of the endpoint device 267 that may include the view 205. Information from the visual feed may comprise all or at least a portion of the inputs to the user context filter. For example, the endpoint device 267 may include a camera, e.g., a charge coupled device (CCD) image sensor for capturing a digital image, a series of images, and/or a video from the environment. The endpoint device 267 may then extract various features from the digital image, series of images, and/or video which may comprise the inputs to the user context filter.

The features may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. In one example, the endpoint device 267 may perform an image salience detection process, e.g., applying an image salience model and then performing an image recognition algorithm over the "salient" portion of the image(s). Thus, in one example, visual features may also include a recognized object, a length to width ratio of an object, a velocity of an object estimated from a sequence of images (e.g., video frames), and so forth.

Features comprising inputs for a user context filter may also include low-level audio features (e.g., captured via a microphone of the endpoint device 267) such as: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Additional audio features may also include high-level features, such as: words and phrases. For instance, one example may utilize speech recognition pre-processing to obtain an audio transcript and to rely upon various keywords or phrases as data points.

Further features that may comprise inputs for a user context filter may include a time of day, day of week, or the like, location information of endpoint device 267, biometric information obtained via biometric sensors that may be worn by a user of endpoint device 267, user calendar and schedule information, and so forth. For example, endpoint device 267 may further determine a location of endpoint device 267 via a GPS unit of endpoint device 267. Alternatively, or in addition, endpoint device 267 may derive the location using other location estimation methods, such as cell identifier (cell ID) based methods, observed time difference of arrival (OTDA) techniques, or barycentric triangulation (e.g., where endpoint device 267 may be equipped for cellular communications).

The machine learning algorithm (MLA), or machine learning model (MLM) trained via the MLA for the user context may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the user context filter may include those features which are determined to be the most distinguishing features of the user context, e.g., those features which are quantitatively the most different from what is considered statistically normal or average, or quantitatively the most different from one or more other user contexts, e.g., the top 20 features, the top 50 features, etc.

In one example, endpoint device 267 may determine a match between the inputs and the user context using any of the visual features, audio features, and/or other inputs mentioned above. For instance, a match may be determined when there is threshold measure of similarity among the inputs and the user context filter. In one example, the inputs may be analyzed using a time-based sliding window, e.g., extracting features from the visual feed, an audio feed, biometric information, etc., and comparing the features to the user context filter.

In the present example, the view 205 may include a large number of vehicles, which when broken down into various input features, may comprise a match to the user context filter for the user context of "parking lot." When there is a match that is determined, endpoint device 267 may then activate an object model (or object models) for detecting one or more objects associated with the user context. In the present example, an object model that is specific to the user's car 292 may be activated. For instance, the object model for the user's car 292 may relate to features that distinguish the user's car 292 from other types of vehicles, from other makes and models of cars, from vehicles with other colors, from vehicles with other distinguishing features, such as different states' license plates, different types or colors of wheel covers, and so forth.

In one example, the object model may also comprise a machine learning model (MLM) for detecting the object in a visual feed. In one example, the object model is associated with a hyper-dimensional space that is representative of physical (visual) properties of an object. For instance, the object model may comprise a discriminator. The discriminator may comprise a MLM that determines whether new data is or is not part of a class represented by training data; in this case the captured measurements/properties of the user's car 292. In one example, the discriminator is a neural network, e.g., a deep neural network (DNN). In other examples, the discriminator may comprise a different type of machine learning model, such as a SVM-based classifier, a distance-based classifier, or the like, or a non-classifier type machine learning model, such as a decision tree, a k-nearest neighbor (KNN) predictive model, and so forth. The creation (and/or updating) of the object model can utilize supervised, unsupervised, or semi-supervised learning (partially labeled data).

In the present example, the view 205 may include the user's car 292, which may be detected via the object model in accordance with visual features that may be extracted from a visual feed of a camera of the endpoint device 267. In addition, once the car 292 is detected, the endpoint device 267 may then provide an enhanced indication of the car 292 via an augmented reality display of the endpoint device 267. For instance, the view 205 illustrated in FIG. 2 may represent what the user will see via the augmented reality display of endpoint device 267 with the enhanced indication of the car 292, in this case a type of highlighting 284. It should be noted that in the present example, the object model is not activated until the user context is determined in accordance with the user context filter and the inputs. Thus, for example, an enhanced indication of the car 292 is not provided when the car 292 is viewed sitting in a driveway or garage by itself. However, when the user context is "parking lot" and there may be a large number of other vehicles, the detection of the user car 292 in accordance with the object model and the providing of the enhanced indication may be of greater assistance to the user of endpoint device 267. The type of enhanced indication may be defined by the object model, may be selected by a user of endpoint device 267, may be determined in accordance with the capabilities of endpoint device 267, and so forth. Thus, in various examples, the type of enhanced indication may include a type of highlighting, such as blinking, halo, brightening, color change, drawing circle or box around object, another type of visual navigation indicator, or a visual enlargement of an object.

As another example, a user context of "birdwatching" may be determined via a different user context filter in accordance with a plurality of inputs (e.g., including at least a visual feed of endpoint device 267). The inputs may include features from a visual feed which may indicate an outdoor scene, a significant percentage of the visuals including the sky, etc., audio features of bird calls, a calendar indicating a scheduled activity of birdwatching, a time being outside of work hours on a weekday or a time on the weekend, and so forth. In one example, the user context filter for "birdwatching" may be selected by the user to be activated on weekends, for example. In addition, in one example, the user context filter for "birdwatching" may be made one of several active user context filters in accordance with a schedule set by the user or learned over time. For instance, endpoint device 267 may learn that the user often birdwatches on Saturday afternoons. Thus, endpoint device 267 may automatically activate the user context filter for "birdwatching" on subsequent Saturday afternoons. The user may not actually engage in birdwatching, but if the user does, the endpoint device 267 may detect the user context in accordance with the inputs and the user context filter for "birdwatching."

Continuing with the present example, when the inputs match the user context of "birdwatching," one or more associated object models may then be activated by endpoint device 267 to detect object(s) of interest. For instance, an object model for birds in general may be activated, one or more object models for particular species of birds may be activated, and so forth. As illustrated in view 210 of FIG. 2, endpoint device 267 may detect a bird 291 in the visual feed of a camera of endpoint device 267 in accordance with at least one object model that is activated for the user context of "birdwatching." In addition, endpoint device 267 may provide an enhanced visual indication comprising a type of highlighting 286 as well as the additional visual navigation indicator 295 (e.g., an arrow pointing in the direction of the bird 291).

In still another example, endpoint device 267 may have an active context filter for "crowd" which may have an associated object model for person 262. For instance, a user of endpoint device 267 may be responsible for a child, a person with dementia, or may simply be travelling with a companion, represented by person 262. Unenhanced view 220 may represent a snapshot of a visual feed of a camera of endpoint device 267. As illustrated, the unenhanced view 220 may contain a crowd of people, including person 262. However, endpoint device 267 may have an active user context filter for "crowd," and may detect the existence of the user context of "crowd" based upon inputs (e.g., including features of the visual feed and/or other features, such as audio features, time information, location information, biometric information, etc.).

In addition, in response to detecting the user context of "crowd," endpoint device 267 may activate the object model for person 262. Accordingly, when endpoint device 267 detect the person 262 in the crowd from the visual feed of a camera of endpoint device 267, the endpoint device 267 may provide an enhanced indication of the person 262. In the present example, the enhanced indication comprises an enlarged representation of the person 262, as shown in enhanced view 225. In one example, the enlargement may comprise performing an object edge detection of person 262 from the visual feed, enlarging the image of person 262 in accordance with the edge/border detection, and then placing the enlarged image back into the visual feed, e.g., superimposing the enlarged image of person 262, for presentation via an augmented reality display of endpoint device 267.

It should be noted that FIG. 2 provides illustrative examples in accordance with the present disclosure. Thus, other, further, and different examples may involve a different type of endpoint device, an endpoint device with different capabilities, and so forth. In addition, the examples of FIG. 2 are described in connection with operations for providing an enhanced indication of an object that is located via a visual feed in accordance with a user context being performed at endpoint device 267. However, in another example, one or more functions of endpoint device 267 may be deployed in a network-based device, such as network-based user context filtering, network-based object detection, and so forth. In such an example, endpoint device 267 may transmit a visual feed, or a visual feed and additional data, such as audio data, biometric information, location information, and so forth to a network-based device, such as AS 145 or one of the servers 175 in FIG. 1. Thus, these and other modifications are all contemplated within the scope of the present disclosure.

Figure 3:
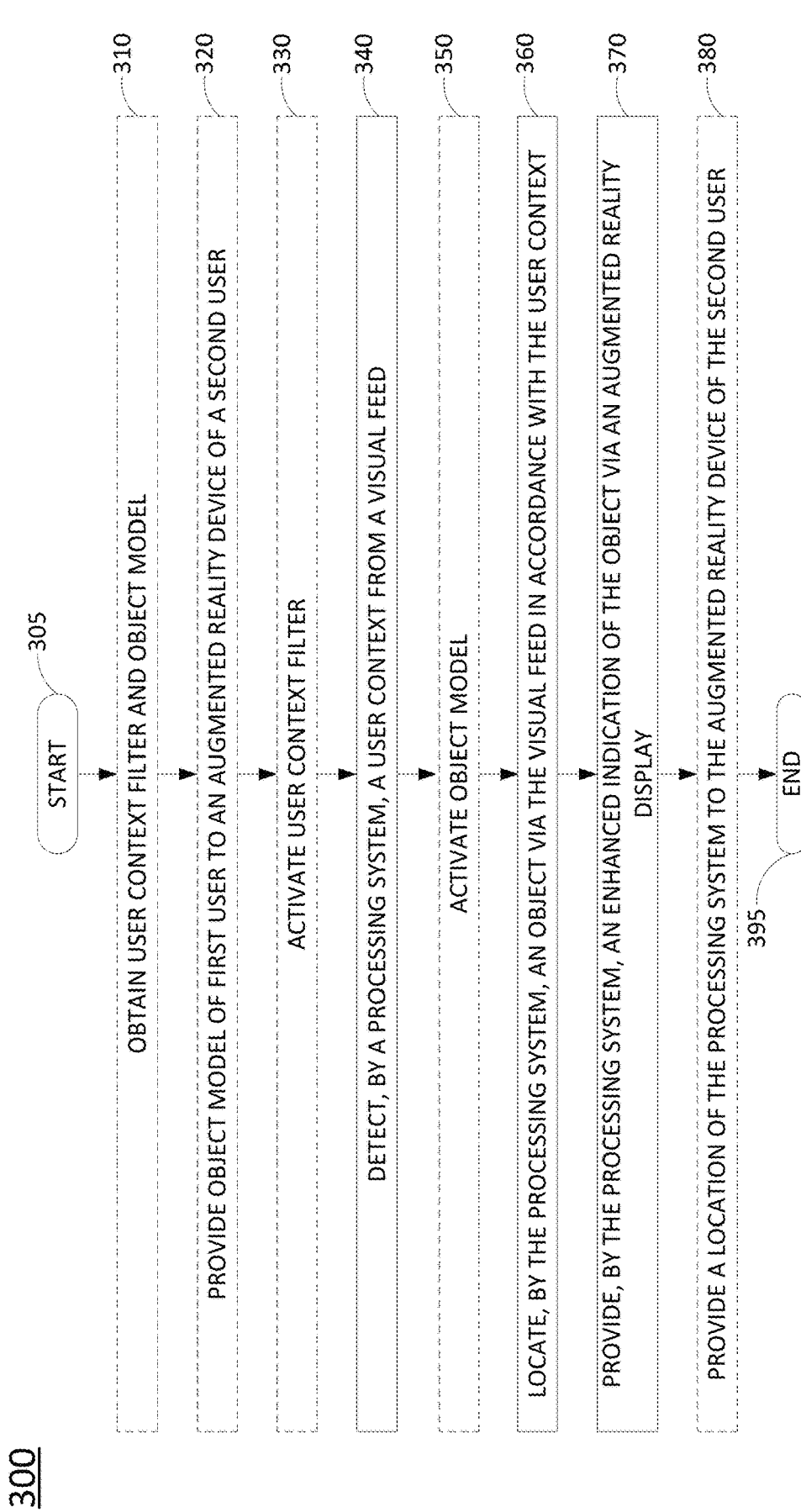
FIG. 3 illustrates an example flowchart of a method for providing an enhanced indication of an object that is located via a visual feed in accordance with a user context.

FIG. 3 illustrates a flowchart of an example method 300 for providing an enhanced indication of an object that is located via a visual feed in accordance with a user context.

In one example, steps, functions and/or operations of the method 300 may be performed by a device as illustrated in FIG. 1, e.g., by one of the endpoint devices 165-167, or any one or more components thereof, such as a processing system, a processing system in conjunction with a GPS unit, a CCD/photo-sensor array, a wireless transceiver, a projector and/or a display screen, and so forth, by AS 145, or by one of the servers 175. Alternatively, or in addition, the steps, functions and/or operations of the method 300 may be performed by a processing system collectively comprising a plurality of devices as illustrated in FIG. 1, such as application server 145, server(s) 175, one or more of the endpoint devices 165-167, and so forth. In one example, the steps, functions, or operations of method 300 may be performed by a computing device or system 400, and/or a processing system 402 as described in connection with FIG. 4 below. For instance, the computing device 400 may represent at least a portion of an endpoint device, a server, an application server, and so forth in accordance with the present disclosure. For illustrative purposes, the method 300 is described in greater detail below in connection with an example performed by a processing system, such as processing system 402. The method 300 begins in step 305 and may proceed to one of optional steps 310-330 or to step 340.

At optional step 310, the processing system may obtain a user context filter and an object model. For example, the processing system may be a network-based processing system or an endpoint device-based processing system and may obtain the user context filter and object model from an attached or integrated storage device and/or from a remote storage device over a network or via a peer-to-peer connection. The user context filter may comprise a machine learning model (MLM) for detecting a semantic content (e.g., a user context) from a plurality of inputs. The plurality of inputs may include information from a visual feed and may further include location information, time information, biometric information, and so forth. The object model may be associated with the user context filter and may be related to locating an object of interest in the visual feed after the user context is detected. The object model may represent an object such as a vehicle, a landmark, another person, (e.g., a face of a second user), and so forth. The object model may similarly comprise a MLM. For instance, the object model may represent visual features of the object, and the inputs (features from the visual feed) to the MLM may be compared to the object model to determine if there is a match.

At optional step 320, the processing system may provide an object model of a first user (e.g., a user of an endpoint device of the processing system) to an endpoint device of a second user. For example, the method 300 may relate to assisting two users locating one another in connection with a user context, such as "being in a crowd," being "nearby a friend," and so forth. In such an example, the user context filter obtained at step 310 may be associated with such a user context, and the object model obtained at step 310 may comprise an object model of the second user, such as an eigenface representing facial features of the second user and/or other features of the second user, such as a height, a build, a gait, etc.

At optional step 330, the processing system may activate a user context filter (e.g., the user context filter obtained at optional step 310). For example, a user may designate certain times of day or days of the week for the user context filter to be active, the user may turn on the user context filter on an ad-hoc basis via a command to the processing system (e.g., a voice command, a touchpad or keyboard input, a gesture via an augmented reality device, etc.), the processing system may learn certain days of the week and/or times when a user context filter is to be activated and may then automatically activate the user context filter during subsequent recurrences of the same days of the week and/or times, and so forth. The user context filter may be activated when another device is detected by the processing system, e.g., when an endpoint device of a second user is within wireless peer-to-peer communication range of the processing system, when the two endpoint devices are in communication with a same cell tower, and so forth. Other conditions may cause the processing system to automatically activate the user context filter, such as a detection of movement greater than a certain speed, a detection of a walking pace, a number of unanswered text messages or phone calls to one or more other users, and so on.

At step 340, the processing system detects a user context from a visual feed. For instance, the processing system may comprise a processing system of a wearable computing device, a smartphone, or the like, and the visual feed may be obtained from a camera of the device. In accordance with the present disclosure, the user context may comprise a semantic content of the visual feed. In addition, in one example, the user context includes at least one action of a user. In one example, the detecting of the user context comprises detecting the semantic content via a machine learning model (MLM) for detecting the semantic content. For example, the MLM for detecting the semantic content may be activated at optional step 330. The user context may be one of several possible user contexts associated with a user of the device of the processing system. In addition, the MLM may be one of several MLMs associated with the same user context. In accordance with the preset disclosure, the MLM for detecting the semantic content comprises a plurality of visual features and may include additional features relating to audio information, location information, biometric information, calendar information, and so forth. Accordingly, in one example, the detecting of the user context from the visual feed further comprises detecting the user context from the visual feed and from location information of the processing system. For example, the location information may include position information and/or movement information of a wearable computing device or other device of the processing system.

At optional step 350, the processing system may activate an object model, e.g., in response to the detection of the user context at step 340. For example, the processing system may activate and/or apply an object model (e.g., a machine learning model (MLM)) for at least one object associated with the user context to the visual feed to identify the object. The object model may be obtained at optional step 310 and may be associated with the user context.

At step 360, the processing system locates an object via the visual feed in accordance with the user context. For example, the processing system may activate and/or apply an object model (e.g., a machine learning model (MLM)) for at least one object associated with the user context to the visual feed to identify the object. The processing system may store the object model or may obtain the object model from another device in connection with the obtaining and/or activating of a user context filter for the user context. In one example, the object may be for identifying a vehicle or a landmark. In another example, the object may be for identifying a person. In such an example, the person may be detected via a facial recognition based on at least one image of a face of the person or at least one eigenface of the person. For instance, the image of the face of the person may be used to train an object model, or an eigenface may comprise the object model that may be used to detect the face of the person in the visual feed.

In one example, the locating of the object via the visual feed further comprises locating the object via the visual feed and via location information of the object. The location information of the object may comprise GPS location information or cellular network location tracking information. The location information of the object may be received via a cellular network, via a wireless local area network and/or via a wireless peer-to-peer communication. The location information may assist the processing system in locating the object or at least identifying the direction of the object in relation to the processing system (and/or an endpoint device of the user, if the processing system is not part of the endpoint device).

At step 370, the processing system provides an enhanced indication of the object via an augmented reality display. The enhanced indication of the object may comprise a highlighting of the object, blinking, a halo, brightening of the object or a region including the object, a color change, drawing a circle or box around object, and so forth. The enhanced indication of the object may alternatively or additionally comprise a visual enlargement of the object, and/or a visual navigational indicator (which may include types of highlighting, as above, but which may also include markers for when the object is not necessarily in the field of view, e.g., an arrow pointing the correct direction to the object). As described above, in one example the processing system may comprise a processing system of a wearable computing device. In addition, in one example, the wearable computing device may comprise a projector and a reflector to place the enhanced indication of the object within a field of view of a user. For instance, the wearable computing device may comprise smart glasses, smart googles, or the like.

At optional step 380, the processing system provides a location of the processing system to an endpoint device of another person. For example, the endpoint device of the person may provide an enhanced indication of the user via the augmented reality device. For instance, in one example, the proximity of the two users (e.g., their endpoint devices) may result in the activation of user context filters, and the detection of the user context(s) may result in the activation of object model(s) for detecting the respective users in respective visual feeds. In other words, the two endpoint devices may assist the respective users in locating one another in a particular user context, or user contexts.

Following step 370 or optional step 380, the method 300 proceeds to step 395. At step 395, the method 300 ends.

It should be noted that the method 300 may be expanded to include additional steps or may be modified to include additional operations with respect to the steps outlined above. For instance, the method 300 may be repeated through various cycles of activating one or more context filters, detecting user context(s), locating objects in accordance with the user context(s), providing enhanced indications of such object(s), and so forth. In one example, the method 300 may be expanded to include learning user context filter activation preferences of a user, where the activating of a user context filter at optional step 330 may be in accordance with such learned preferences. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for providing an enhanced indication of an object that is located via a visual feed in accordance with a user context, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for providing an enhanced indication of an object that is located via a visual feed in accordance with a user context (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing an enhanced Indication of an object that is located via a visual feed in accordance with a user context (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system including at least one processor, a user context from a visual feed, wherein the user context comprises a semantic content of the visual feed, wherein the detecting the user context comprises detecting the semantic content via a machine learning model for detecting the semantic content;
   locating, by the processing system, an object via the visual feed in accordance with the user context; and
   providing, by the processing system, an enhanced indication of the object via an augmented reality display.

2. The method of claim 1, wherein the locating the object via the visual feed further comprises locating the object via the visual feed and via location information of the object.

3. The method of claim 2, wherein the location information of the object comprises at least one of:
   global positioning system location information;
   cellular network location tracking information; or
   peer-to-peer wireless communication information.

4. The method of claim 2, wherein the location information of the object is received via a cellular network.

5. The method of claim 2, wherein the location information of the object is received via a peer-to-peer wireless communication.

6. The method of claim 1, wherein the user context includes at least one action of a user.

7. The method of claim 1, wherein the detecting the user context from the visual feed further comprises detecting the user context from the visual feed and from location information of the processing system.

8. The method of claim 1, further comprising:
   activating a user context filter comprising the machine learning model for detecting the semantic content.

9. The method of claim 1, wherein the machine learning model for detecting the semantic content comprises a plurality of visual features.

10. The method of claim 1, further comprising:
    activating an object model for locating the object in the visual feed, wherein the object model is activated in response to the detecting the user context from the visual feed.

11. The method of claim 1, wherein the object comprises:
    a vehicle; or
    a landmark.

12. The method of claim 1, wherein the enhanced indication of the object comprises at least one of:
    a highlighting of the object;
    a visual enlargement of the object; or
    a visual navigational indicator.

13. The method of claim 1, wherein the processing system comprises a processing system of a wearable computing device, wherein the visual feed is obtained from a camera of the wearable computing device.

14. The method of claim 13, wherein the wearable computing device further comprises a projector and a reflector to place the enhanced indication of the object within a field of view of a user.

15. The method of claim 1, further comprising:
    providing an object model of a first user to an endpoint device of a second user, wherein the endpoint device of the second user provides an enhanced indication of the first user.

16. The method of claim 15, further comprising:
    providing a location of the processing system to the endpoint device of the second user, wherein the processing system is a processing system of an endpoint device of the first user.

17. A non-transitory computer-readable medium storing instructions which, when executed by a processing system including at least one processor, cause the processing system to perform operations, the operations comprising:
    detecting a user context from a visual feed, wherein the user context comprises a semantic content of the visual feed, wherein the detecting the user context comprises detecting the semantic content via a machine learning model for detecting the semantic content;
    locating an object via the visual feed in accordance with the user context; and
    providing an enhanced indication of the object via an augmented reality display.

18. A device comprising:
    a processing system including at least one processor; and
    a computer-readable medium storing instructions which, when executed by the processing system, cause the processing system to perform operations, the operations comprising:
    detecting a user context from a visual feed, wherein the user context comprises a semantic content of the visual feed, wherein the detecting the user context comprises detecting the semantic content via a machine learning model for detecting the semantic content;

locating an object via the visual feed in accordance with the user context; and providing an enhanced indication of the object via an augmented reality display.

19. The device of claim 18, wherein the detecting the user context from the visual feed further comprises detecting the user context from the visual feed and from location information of the device.

20. The device of claim 18, the operations further comprising:

activating an object model for locating the object in the visual feed, wherein the object model is activated in response to the detecting the user context from the visual feed.

* * * * *